LOGARITHMIC AMPLIFIER

Filed Feb. 17, 1953

INVENTOR.
SOLOMON SHERR
BY H. L. Mackey
ATTORNEY 2,774,825
Patented Dec. 18, 1956

2,774,825

LOGARITHMIC AMPLIFIER

Solomon Sherr, Tuckahoe, N. Y., assignor to General Precision Laboratory Incorporated, a corporation of New York Application February 17, 1953, Serial No. 337,291

4 Claims. (Cl. 179—171)

This invention relates to electronic amplifiers in which the relation between the output and input voltages obeys an approximately logarithmic law.

Radio receivers of the linear type always have an upper input signal strength limit at which the final stage of amplification becomes saturated. When such a receiver is used for radar reception it is easily saturable by ground clutter and reflections from rain drops, when it no longer can respond to useful echo signals. One remedy is to employ an amplifier in which the gain is automatically reduced in inverse proportion to the strength of the input signal. Such an amplifier saturates only at exceedingly high levels. It may easily be shown that mathematically the relation in such an amplifier between input and output voltages is $$E=K \log e+C$$

in which, E is the output voltage, $e$ is the input signal voltage, and K and C are constants.

An amplifier of this type has many other uses. For example, it is useful in lobe-comparison radar circuits in which lobe returns differing in strength by 100 db or more can be compared without the necessity of using conventional gain control. It is also useful in wire video transmission when noise limits the minimum power and amplifier tube capacity limits the maximum power. By employing the amplitude compression effected by a logarithmic amplifier a very large dynamic range can be transmitted.

Logarithmic amplification characteristics can be obtained by feedback, by using the curvature of the characteristic curve of a remote cut-off triode, and by combining the outputs of several channels having different gains. This third method is employed in this invention. While by itself it produces a characteristic curve made of a number of short straight lines, such an amplifier being termed a linear-logarithmic amplifier, this method can easily be combined with a modification of the second method to produce a composite characteristic curve made of a number of short curved lines, so that the composite curve very closely approaches a true logarithmic curve.

By saturation of an amplifier stage is meant the application to its control grid of a signal so large as to cause the grid to draw current, so that the grid voltage no longer varies relative to the cathode, but instead is practically constant relative thereto. The stage amplification constant is thus reduced to very nearly unity. When the input signal is alternating and large, grid rectification occurs, so that by provision of an appropriate take-off circuit the rectified or demodulated signal may be secured.

In a multistage amplifier, when the input signal is less in amplitude than the amount required to saturate the last stage, normal full amplification by all stages occurs, and if the amplifier is followed by a rectifier the amplified signal is demodulated and the modulating signal is recovered. When, however, the input signal is great enough to saturate the last stage but not great enough to saturate the next to last stage, all stages but the last continue to amplify. Now if an appropriate take-off circuit be provided to secure the rectification product of the final stage grid circuit, and if this product be added in the proper phase to the output of the following rectifier, the final output will be the input signal multiplied by the gain of all stages except the last. If such a rectification take-off be provided at each stage, successively larger orders of signal input magnitude will cut off the amplifier at successively earlier stages, each time cutting down the gain by the amount of the gain of one stage, and the rectified outputs of all cut-off stages can be added in the proper phase to form a composite rectified output.

It may be shown that when an amplifier is so operated, the composite characteristic curve, if smoothed, is a true logarithmic curve, because the inputs have arithmetical increments corresponding to output increments in geometric series.

The purpose of this invention is to provide an amplifier having an input to output relation of generally logarithmic or exponential nature.

More specifically, the purpose of this invention is to provide an amplifier having a plurality of stages each of which function as amplifiers when operating below saturation, and as rectifiers when operating above saturation.

Still more specifically, the purpose of this invention is to provide an amplifier having at least one stage wherein an amplified output is derived from the anode when the stage operates below saturation, and in which a rectified output is derived from the grid-cathode circuit when the stage operates above saturation.

A further understanding of the invention may be secured from the detailed description and drawings, in which.

Figure 1:
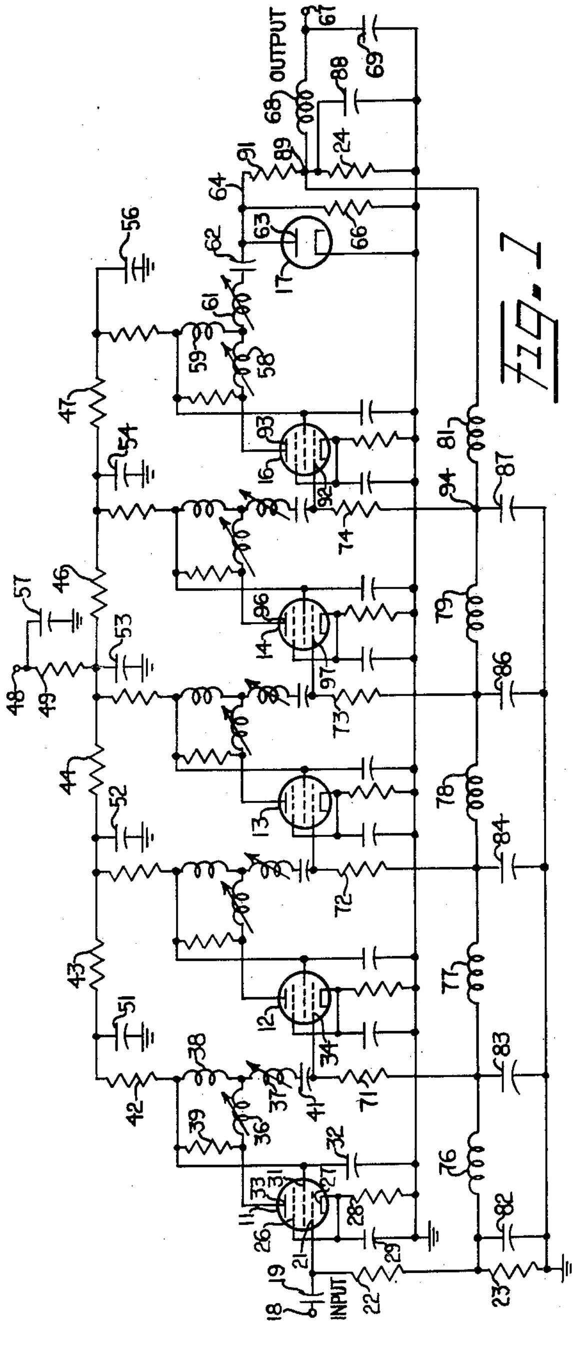
Figure 1 represents the circuit of a logarithmic type amplifier embodying the invention.

Referring now to Fig. 1, a five-stage amplifier comprising pentodes 11, 12, 13, 14 and 16 is followed by a diode demodulator or detector 17. The invention is applicable, however, to an amplifier of any number of stages and employing any type of amplifier tube, including triodes, tetrodes and beam power tetrodes. The circuitry and the component sizes in this example are designed for a carrier pass band having a lower limit of 55 mc. p. s. and an upper limit of 65 mc. p. s., with modulation lying in the 0 to 4 mc. p. s. range. However, this invention is applicable to amplifiers designed for any frequency from the lowest to the highest for which electronic tubes can be employed. All stages of the amplifier of Fig. 1 are similar in that each stage functions as an amplifier on signals too weak to block or saturate it, and functions as a rectifier or demodulator on saturating signals. However, stages embodying this invention may be combined in cascade with stages of conventional type.

Input signals applied to the input terminal 18 are coupled through condenser 19 to the control grid 21 of pentode 11. The direct current grid return is through resistor 22 and through resistors 23 and 24 connected in parallel. The suppressor grid 26 is connected to the cathode 27 and the cathode resistor 28 is bypassed by condenser 29, so that both the suppressor grid and cathode are at ground potential for alternating currents. The screen grid 31 is connected to a positive potential and is grounded for alternating currents by condenser 32. The anode 33 is connected to the control grid 34 of the next stage including the pentode 12 by an autotransformer coupling consisting of adjustable inductors 36 and 37, and inductor 38. The primary circuit comprises inductors 36 and 38 and is tuned to carrier frequency, the capacitance of the inductors. The secondary circuit comprises inductors 37 and 38 and is also tuned to the carrier frequency. Damping and bandwidth control are secured by use of the resistor 39 and by proper proportioning the inductors for desired coupling. Condenser 41 isolates the grid 34 from the positive potential source.

The circuits of pentodes 12, 13, 14 and 16 are identical to that of the pentode 11 just described, and hence need not be described in detail herein. In each stage the positive anode potential is applied through a small resistor such as 42 to the non-adjustable inductor such as 38. All five anode supply resistors are connected to a bus conductor which, however, is broken between stages by four small resistors 43, 44, 46 and 47. The positive supply terminal 48 is connected through a small resistor 49 to an intermediate point of the bus conductor. All junction points and the supply terminal are grounded for alternating currents by condensers 51, 52, 53, 54, 56 and 57. This network of condensers and resistors constitutes a multiple decoupling network to reduce feedback. For example, condensers 32 and 51 and resistor 42 constitute a pi section decoupling the first stage from other stages by way of the anode supply.

The output stage, namely, pentode 16 is coupled through inductors 58, 59 and 61 and condenser 62 to the anode 63 of a diode 17, so that a negative potential representative of the modulating envelope appears on conductor 64. Resistor 66 provides a matching load and output is taken from terminal 67 with the carrier frequency filtered out by a low pass filter consisting of inductor 68 and condenser 69.

The amplifier as so far described is composed of conventional components and operates conventionally as an amplifier of input signals below saturating strength. However, if signals be applied to any stage in sufficient strength to saturate it, its amplification constant drops to approximately unity and the stage automatically commences to produce a second output through a second output circuit connected to the control grid of each stage. These circuits extend from the respective control grids through resistors 22, 71, 72, 73 and 74 to a time delay network composed of inductors 76, 77, 78, 79 and 81 and condensers 82, 83, 84, 86 and 87. The network is terminated at one end by resistor 23 and condenser 82 and at the other end by resistor 24 and condenser 88. This network sufficiently isolates the control grids with regard to carrier frequencies while providing multiple paths for the modulation frequencies from the individual grids to the junction 89, applying selective delays equal to the transit times through the amplifier stages so that all demodulated signals arrive at the junction 89 in phase with each other and in phase with the demodulated output of diode 17 applied through the decoupling resistor 91.

In the operation of the amplifier let it be assumed that a modulated signal having a carrier frequency of 60 mc. p. s. is applied to input terminal 18. If the input signal is less than that required to saturate the final amplifier tube 16, all tubes amplify, all control grids operate in their normal amplifying ranges on the straight portions of their characteristic curves, and do not draw appreciable grid current. All of the output is applied to diode 17, is demodulated, and the demodulated output appears at output terminal 67. Resistors 22, 71, 72, 73 and 74 serve only as direct current paths for their respective grids, the paths being completed to ground through small inductors 76, 77, 78, 79 and 81, and resistors 23 and 24. In this condition of operation the output is normally nearly linear.

Figure 2:
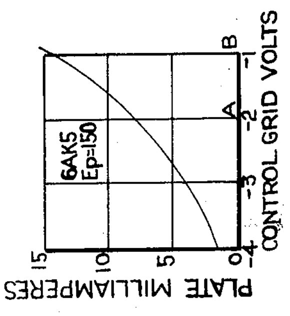

For example, if tubes commonly of the type known as 6AK5 are used, operation can be selected to be along the nearly straight section AB of the characteristic curve, Fig. 2. That is, zero input signal produces operation at A, and a signal which is just below saturation of the tube 16, produces operation at B. The characteristic of the entire amplifier in terms of signal strength is therefore represented by a straight line starting at the origin, as the section OC of Fig. 3.

When, however, the input signal is so large that the control grid 92 of pentode 16 draws current on its positive swings, the amplifier output at anode 93 is limited at the value it then has and cannot be increased above that value by any increase of input signal strength. The output as demodulated by diode 17 and applied through resistor 91 to junction 89 is likewise limited and held at the value it has when grid 92 begins to draw current, and cannot increase above it.

When the grid 92 becomes saturated it begins to rectify or demodulate, and the demodulated signal is applied to the junction 94 through resistor 74. The demodulated signal is conducted through the section of delay line comprising inductor 81 and capacitor 87, where it suffers a slight delay, to the junction 89, where it arrives in phase with the energy applied to junction 89 through resistor 91. Since these two energies are in phase, they add directly to form an output at conductor 67 which is their arithmetical sum.

Thus at signal inputs in excess of the saturation level for the stage, grid rectification takes place in the grid-cathode circuit thereof and this circuit also acts as a grid limiter circuit insuring that the anode output of the stage remains constant once this grid rectification level is reached.

As the amplifier input signal is increased in strength the output of pentode 14 derived from its anode 96 increases approximately proportionately, increasing the demodulated output taken from control grid 92 through resistor 74. This increase in output is represented by the straight line CD, Fig. 3. Its slope, representing total amplifier gain, is less than the slope of OC because the gain is now that of only four stages, rather than five. The straight line CD is limited at D by the commencement of current flow in control grid 97.

A similar process occurs in the third, second and first stages as the input signal increases, the outputs being respectively represented by the straight lines DE, EF and FG. At the point G the first stage tube 11 becomes saturated and no further increase of output signal is possible, all stages being saturated, and the curve of Fig. 3 becomes horizontal. The points O, C, D, E, F and G lie on a logarithmic curve, since the abscissae increase in accordance with powers of the gain of a single amplifier stage, while the ordinates increase arithmetically.

Figure 3:
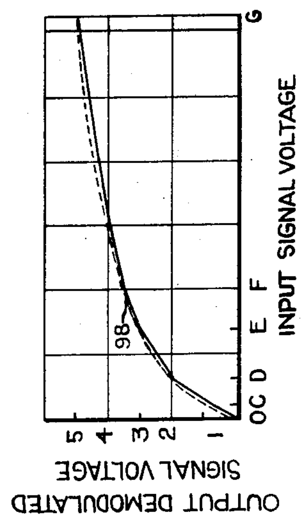
Figures 2 and 3 are graphs illustrating the operation of the amplifier of the invention.

If tubes are used which have suitable characteristics and if they are operated over a range in which the characteristic curves toward the right, the straight line segments of Fig. 3 become curved line segments, and the entire curve becomes more nearly logarithmic, and approaches in shape the ideal logarithmic curve indicated by the dashed curve 98.

What is claimed is:

1. A logarithmic amplifier comprising, a plurality of electronic amplifying stages connected in cascade, a rectifier connected to the amplifier output producing a rectified signal at the output of said rectifier, a rectifier circuit including a resistor interconnecting the control grid and cathode of at least the latter of said amplifier stages forming a diode circuit for signals above a preselected level whereby signals above said preselected level initiate grid current flow and are rectified by the control grid-cathode circuit thereof, and a time delay network interconnecting said rectifier circuit and the output of said rectifier whereby signals rectified in said amplifier stage are added to said rectifier output in phase therewith.

2. A logarithmic amplifier comprising, a plurality of electronic amplifying stages connected in cascade, a rectifier connected to said amplifier output producing a rectified signal at the output of said rectifier, a rectification circuit including a resistor interconnecting the control grid and cathode of the last stage of said amplifier forming a diode circuit for signals above saturation level whereby signals exceeding the saturation level of said last amplifier stage initiate grid current flow and are rectified by the grid-cathode circuit thereof, and a time delay network interconnecting said rectification circuit and the output of said rectifier whereby rectified signals developed in said amplifier stage are added in phase with the rectified signals produced by said rectifier.

3. A logarithmic amplifier comprising, a plurality of electronic amplifying stages connected in cascade, a rectifier connected to said amplifier output producing a rectified signal at the output of said rectifier, rectification circuits each including a resistor interconnecting the respective control grids and cathodes of at least the latter stages of said amplifier forming diode circuits for signals above saturation level of respective stages whereby signals which exceed the respective saturation levels of said stages initiated grid current flow therein and are rectified by the grid-cathode circuit thereof, a time delay circuit composed of a plurality of sections connected in cascade, the number of sections being equal to the number of amplifier stages provided with grid-cathode rectification circuits, the output of said time delay circuit being connected to the output of said rectifier and the control grids of successive ones of said latter amplifier stages being connected to the successive inputs of said time delay network sections.

4. A logarithmic amplifier comprising, a plurality of electronic amplifying stages connected in cascade, a rectifier connected to said amplifier output producing a rectified signal at the output of said rectifier, rectification circuits each including a resistor interconnecting the respective control grids and cathodes of each of said amplifier stages forming diode circuits for signals above saturation level of respective stages whereby signals which exceed the respective saturation levels of said stages initiate grid current flow therein and are rectified by the grid-cathode circuit thereof, a time delay network composed of a number of sections equal to the number of amplifier stages, said sections being connected in cascade with the output of said network connected to the output of said rectifier and the inputs of successive sections respectively connected to the control grids of successive amplifier stages.

References Cited in the file of this patent

UNITED STATES PATENTS

| | | |
|---|---|---|
| 2,210,497 | Percival | Aug. 6, 1940 |
| 2,273,163 | Wilson | Feb. 17, 1942 |
| 2,496,551 | Lawson et al. | Feb. 7, 1950 |
| 2,577,781 | Loughlin | Dec. 11, 1951 |
| 2,662,978 | Sunstein | Dec. 15, 1953 |